United States Patent
Picard et al.

(10) Patent No.: US 7,591,905 B2
(45) Date of Patent: Sep. 22, 2009

(54) METHOD AND APPARATUS FOR TWO DIMENSIONAL ASSEMBLY OF PARTICLES

(75) Inventors: Gilles Picard, Trois-Riviéres (CA); Juan Schneider, Laval (CA)

(73) Assignee: Nanometrix Inc., Montreal, Quebec (CA)

( * ) Notice: Subject to any disclaimer, the term of this patent is extended or adjusted under 35 U.S.C. 154(b) by 0 days.

(21) Appl. No.: 11/760,293

(22) Filed: Jun. 8, 2007

(65) Prior Publication Data

US 2007/0231498 A1 Oct. 4, 2007

Related U.S. Application Data

(63) Continuation of application No. 10/981,485, filed on Nov. 5, 2004, now Pat. No. 7,241,341, which is a continuation of application No. PCT/CA03/00697, filed on May 12, 2003.

(30) Foreign Application Priority Data

May 10, 2002 (CA) ................................. 2385911

(51) Int. Cl.
*B05C 3/02* (2006.01)
(52) U.S. Cl. .............. 118/663; 118/664; 118/688; 118/708; 118/712; 118/404
(58) Field of Classification Search ........ 118/402, 118/310, 312, 600, 602, 712, 683, 684, 708, 118/304, 264, 663, 664, 688; 264/298; 427/180, 427/434.5, 428.01, 8, 430.1, 434, 3
See application file for complete search history.

(56) References Cited

U.S. PATENT DOCUMENTS

| | | | | |
|---|---|---|---|---|
| 2,553,365 A | * | 5/1951 | Ferris ........................ | 264/165 |
| 3,551,244 A | * | 12/1970 | Francis et al. ............... | 156/246 |
| 4,544,395 A | * | 10/1985 | Evans ........................ | 65/60.3 |
| 4,716,851 A | * | 1/1988 | Saito et al. .................. | 118/402 |
| 5,106,561 A | * | 4/1992 | Singh et al. ................. | 264/165 |
| 5,512,326 A | * | 4/1996 | Albrecht et al. .......... | 427/430.1 |
| 5,908,666 A | * | 6/1999 | Nakamura .................. | 427/402 |
| 6,517,979 B1 | * | 2/2003 | Kokubo et al. ................ | 430/7 |
| 6,848,897 B2 | * | 2/2005 | Lazarev et al. .............. | 425/224 |

FOREIGN PATENT DOCUMENTS

| | | | |
|---|---|---|---|
| EP | 0678345 | * | 10/1995 |
| EP | 0881000 | * | 12/1998 |
| JP | 62-291931 | * | 12/1987 |
| WO | WO01/89716 | * | 11/2001 |

* cited by examiner

Primary Examiner—Laura Edwards
(74) Attorney, Agent, or Firm—Ogilvy Renault LLP

(57) ABSTRACT

A method and an apparatus (10) for making thin layers from particles, wherein the particles are deposited on a carrier fluid flowing by gravity along a ramp (12) leading to a dam (18). The particles are held back at the bottom of the ramp (12), thereby causing the particles to be piled up one against the other in a monolayer configuration.

12 Claims, 7 Drawing Sheets

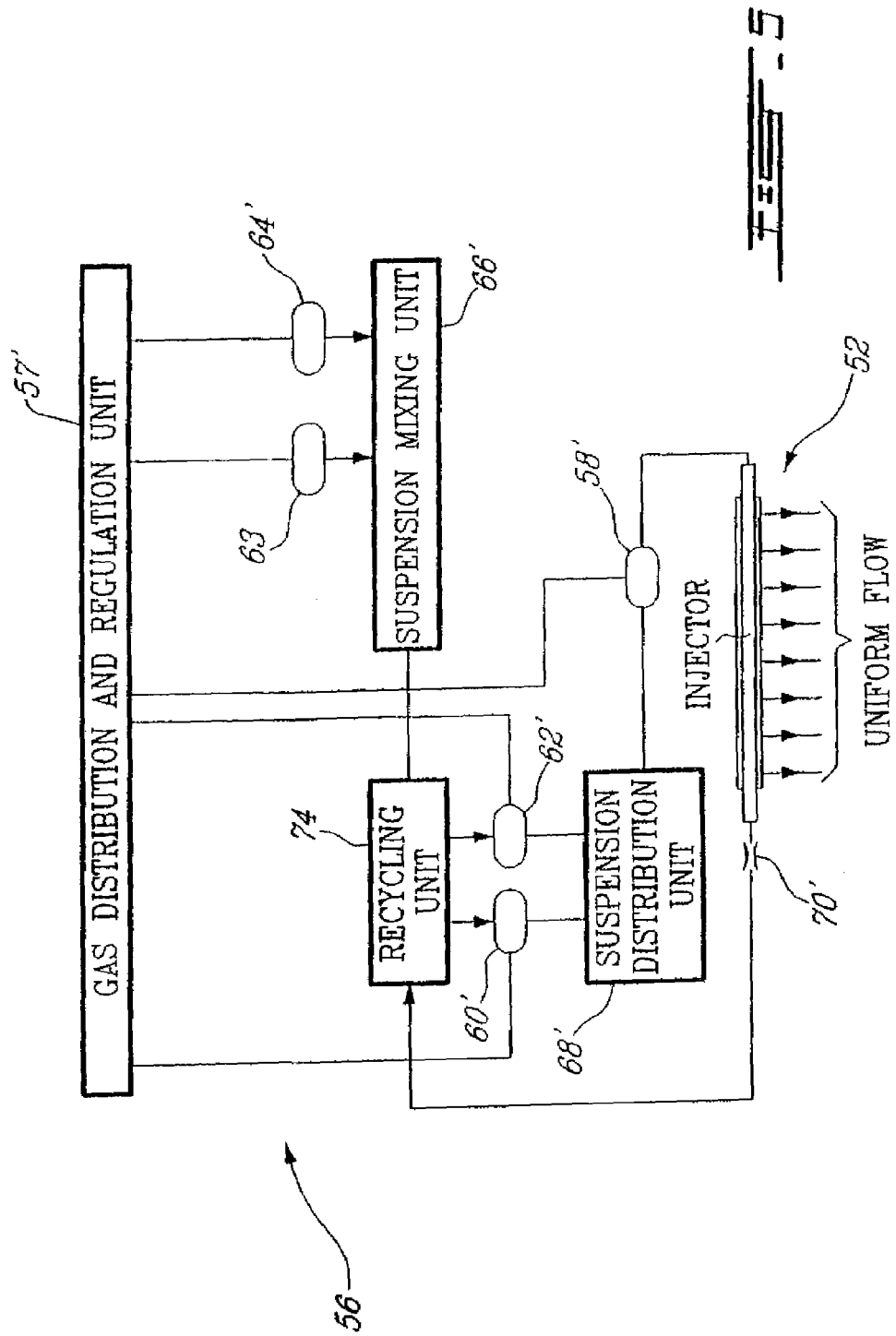

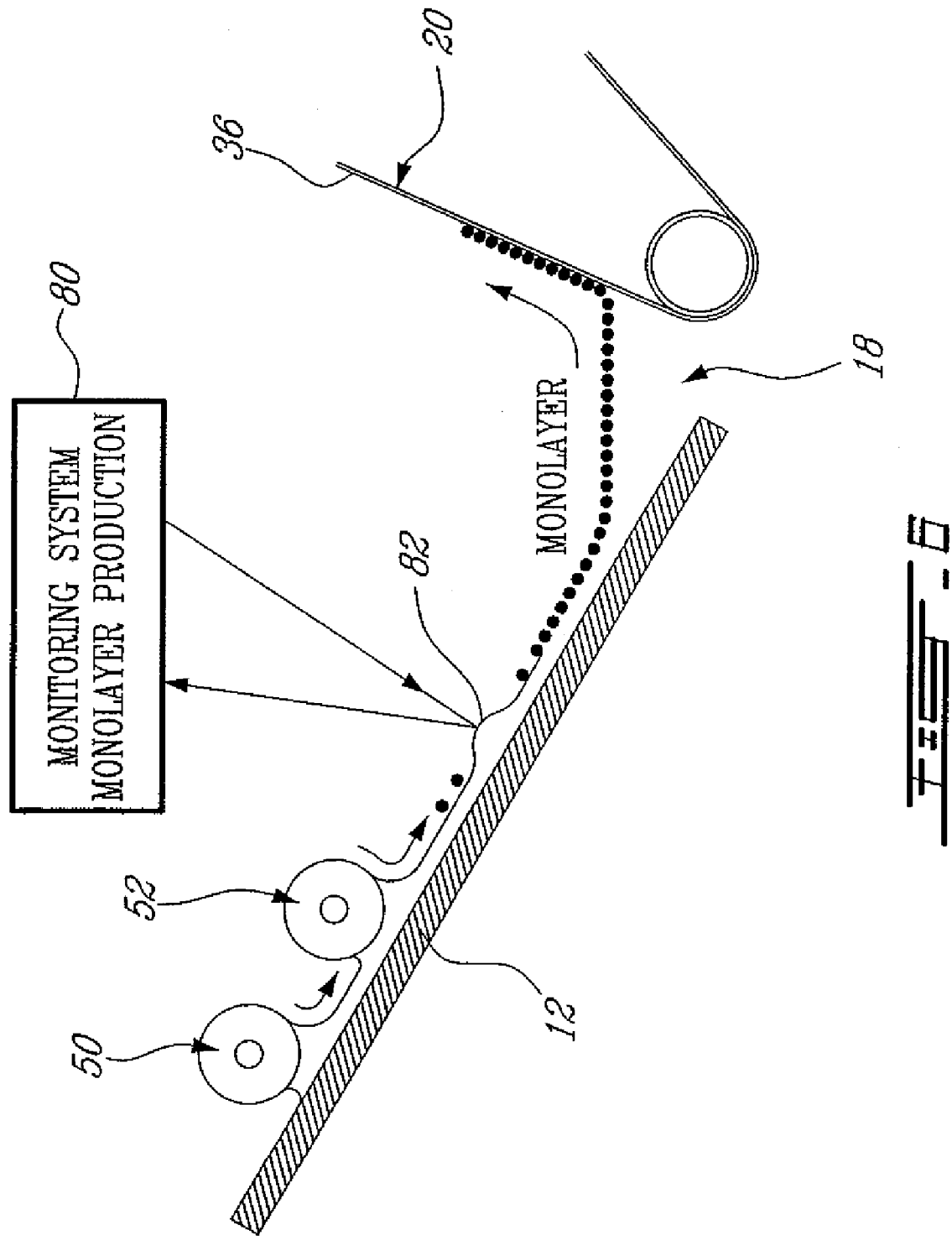

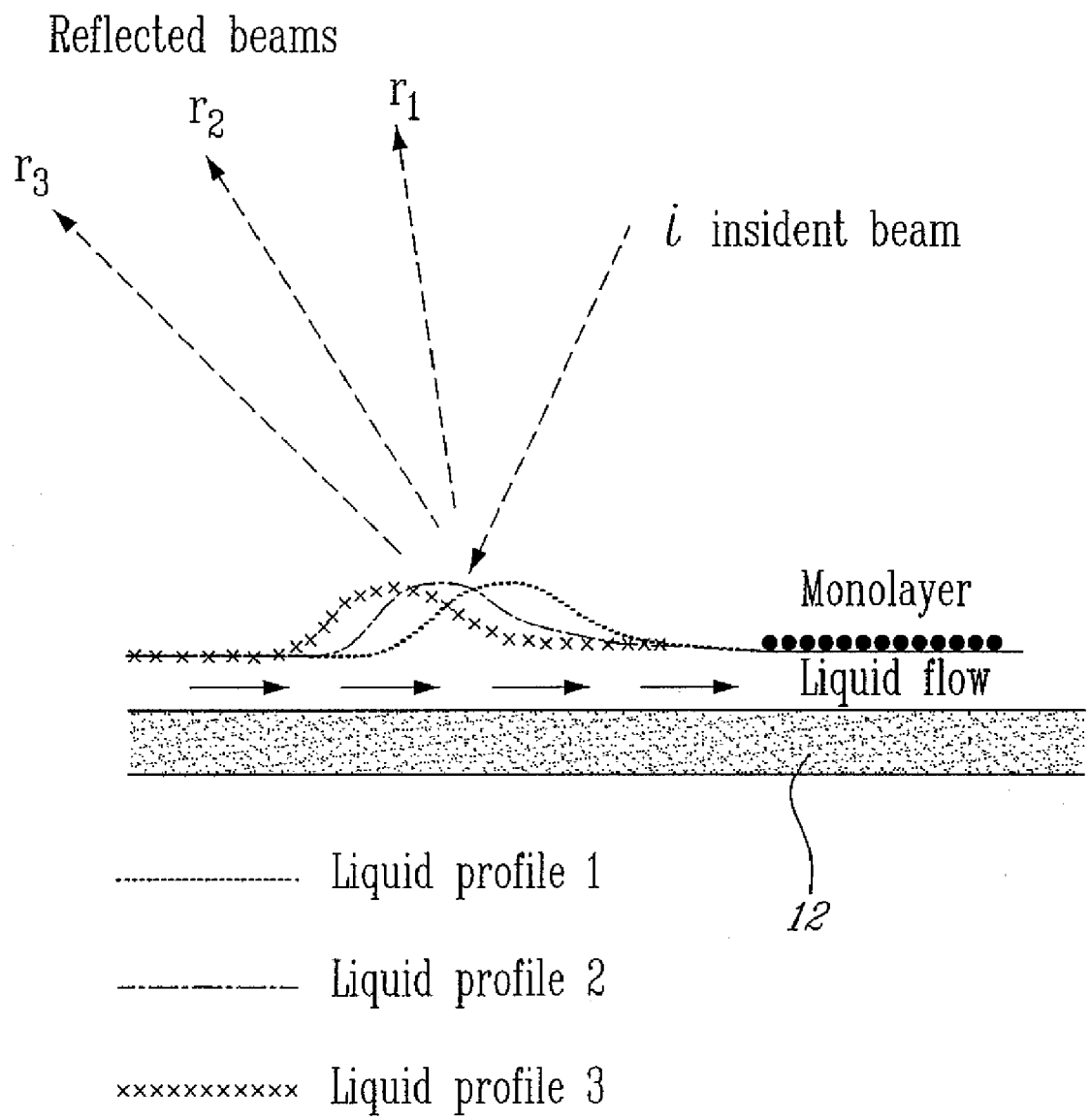

METHOD AND APPARATUS FOR TWO DIMENSIONAL ASSEMBLY OF PARTICLES

RELATED APPLICATIONS

This is a continuation of U.S. patent application Ser. No. 10/981,485 filed on Nov. 5, 2004 U.S. Pat. No. 7,241,341 issued on Jul. 10, 2007, which is a continuation of International PCT Application No. PCT/CA03/00697 filed on May 12, 2003, which claims the benefit of Canadian Application No. 2,385,911 filed on May 10, 2002.

BACKGROUND OF THE INVENTION

1. Field of the Invention

The present invention relates to a method and an apparatus for making monolayers of particles or molecules and, more particularly, to such methods and apparatuses suited for large scale production industries.

2. Description of the Prior Art

In today's high technology industry, the miniaturization of electronic circuitry, high-density storage of information, screen display and other devices are reaching sub micrometer level. Decades ago, several methods were invented to achieve small devices and proved to be performing in the sub-millimeter level like smearing, spreading, shearing, microtomization, extrusion or passing between rollers to thin down. While these methods are approaching the micrometer scale, defects are likely to occur like holes, bumps, disorientation, cracks, etc. The production of layers by sublimation of material under vacuum is interesting for inorganic material, and nanometer thick layers were made. Unfortunately, this obliges the use of elevated temperature for metals that destroy fragile material like proteins or magnetic clusters that could be involved in the process. Moreover, the orientation or more generally the organization of matter in such approaches is not possible, atoms or molecules being piled up at random one above the other.

Therefore, it has been proposed to drive particles onto flat planes and packing them side-by-side to construct layers. The organization of matter in such thin layers yields interesting properties in optics, electronics, bio detection, filtration, magnetic storage devices, etc. Indeed, the size of the objects to be manipulated can be anywhere between 1 millimeter and one tenth of a nanometer. Therefore, through the decades, several 2D assembly methods were invented in order to achieve such organization, but most of them proved to be unsuitable for large scale production industries.

The first 2D assembly method was invented at the beginning of the XXth century. It simply consisted in depositing particles onto a flat gas-liquid interface and bringing them together with mobile barriers to form a monolayer. Initially thought as being uniform and defect free, the monolayers being made of particles approached from every direction led to holes and local collapses in the monolayer.

Canadian Patent Application No. 2,291,825 published on Dec. 3, 1998, discloses a method and an apparatus for preparing monolayers of particles. More particularly, this document discloses a Dynamic Thin Laminar Flow (DTLF) method wherein a liquid film, containing a suspension of particles, is injected onto a rotary cylinder. The rotation of the cylinder pushes the particles one against the other to form a continuous monolayer on the rotary cylinder. The rotary cylinder is advanced longitudinally with respect to a substrate on which the monolayer is deposited. According to this method, mechanical devices are necessary to produce the driving force required to bring the particles one against the other. Moreover, the dimensions of the rotary cylinder limit the size of the monolayer that can be produced with this method. The rotary cylinder also contributes to limit the monitoring zone required to control the production of the monolayers.

Although the method described in the above-mentioned patent application is efficient, it has been found that there is a need for a new method and apparatus, which offers flexibility in production while allowing for easier monitoring and control thereof.

SUMMARY OF THE INVENTION

It is therefore an aim of the present invention to provide a method and an apparatus for making thin layers of particles in large scale production environment.

It is also an aim of the present invention to provide a method and an apparatus that offer flexibility in production.

It is a further aim of the present invention to provide a method and an apparatus that facilitate the control of the production of thin layers of particles.

Therefore, in accordance with the present invention, there is provided an apparatus for making monolayers of particles, comprising a film forming surface, a fluid supply system to provide a film of moving fluid on the film forming surface, a particle supply system for depositing particles onto the film as the fluid is flowing along the film forming surface, the film of fluid carrying the particles forward to a dam, the dam causing incoming particles to be assembled side-by-side so as to gradually form a layer of particles.

In accordance with a further general aspect of the present invention, there is provided a method for making monolayers of particles, comprising the steps of: depositing particles onto a carrier fluid flowing along a surface so that the particles are carried by the carrier fluid to a formation zone, and damming the particles transported by the fluid carrier in the formation zone to cause the particles to be gradually piled up one against the other in a thin layer configuration.

BRIEF DESCRIPTION OF THE DRAWINGS

Having thus generally described the nature of the invention, reference will now be made to the accompanying drawings, showing by way of illustration a preferred embodiment thereof, and in which:

FIG. 5 is a diagram of a suspension supply system for feeding the second porous injector shown in FIG. 3;

FIG. 6 is a schematic side elevation view illustrating how the growth of the monolayer at the bottom of the hydrophilic plate is monitored; and FIG. 7 is a schematic side elevation view illustrating the principles behind the monitoring of the monolayer production.

DESCRIPTION OF THE PREFERRED EMBODIMENTS

Figure 1:
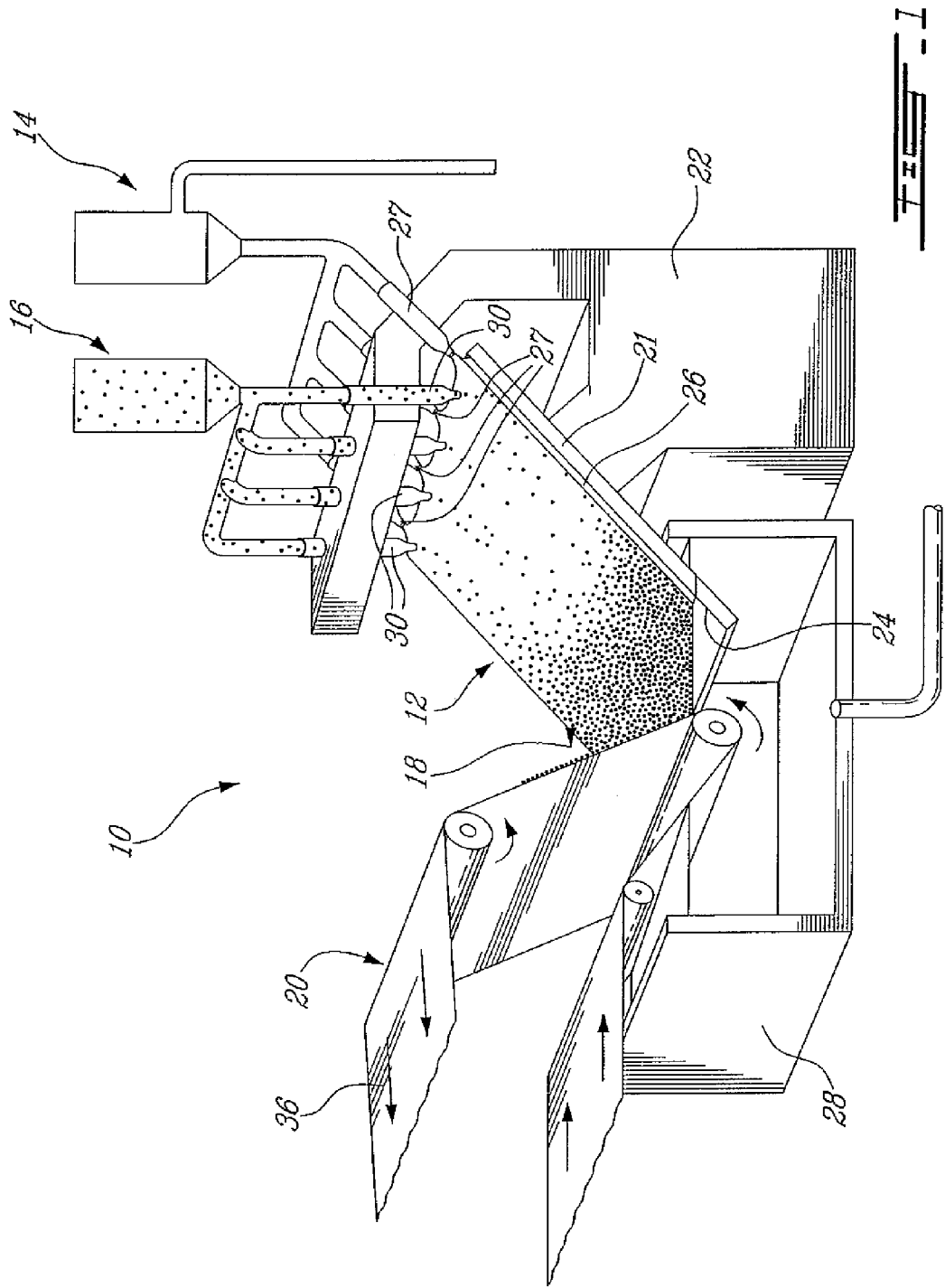
FIG. 1 is a schematic perspective view of an apparatus for making thin layers of particles according to a first embodiment of the present invention.

Now referring to the drawings, a method and an apparatus 10 suited for fabricating thin layers of particles for industrial applications will be described. As will be seen hereinafter, the layers can be well ordered in two dimensional array or crystals, or be amorphous or even porous if required.

Figure 2:
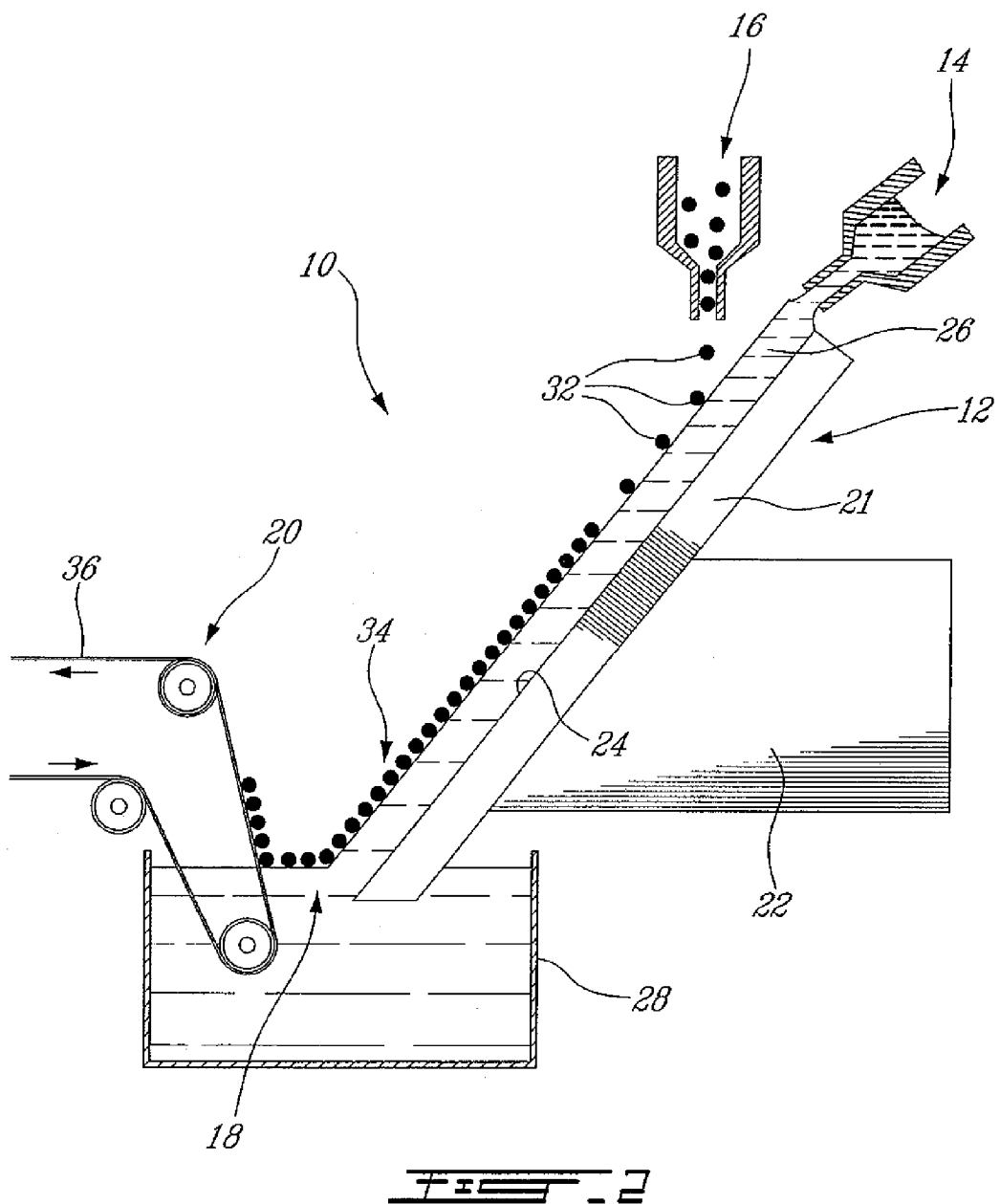
FIG. 2 is a schematic side elevation view of the apparatus of FIG. 1.

The construction of the apparatus 10 is characterized by its simplicity, which provides its major improvement. As shown in FIGS. 1 and 2, the apparatus 10 or monolayer generator generally comprises an hydrophilic surface typically in the form of a ramp 12 having an adjustable slope, a carrier fluid supply system 14 and a particle supply system 16 both located at an upper end portion of the ramp 12, a dam 18 at a bottom end portion of the ramp 12, and a monolayer transferring device 20.

According to a preferred embodiment of the present invention, the ramp 12 is provided in the form of a rectangular plate 21 (50 cm long, 10 cm wide and 0.5 cm thick) supported in an inclined position by an appropriate support structure 22. The support structure 22 may be adjusted to vary the inclination of the rectangular plate 21 as desired.

The rectangular plate 21 has a flat surface 24 on which a thin film 26 (less than one millimeter) of carrier fluid is continuously supplied by the carrier fluid supply system 14. The carrier fluid is forced through a series of laterally spaced-apart injectors 27 onto the inclined surface 24 with a slight pressure. A few cm downstream the injectors 27, the flux of the carrier fluid is diffused over the entire width of the surface 24 exploiting the capillary properties of an appropriate filter. In this way, the flow covers the whole surface of the ramp 12 uniformly. The number of the injectors 27 will depend on the width of the ramp 12 itself. The carrier fluid flows down by gravity along the sloped surface 24 and is received in a fluid reservoir 28 provided at the bottom of the ramp 12. A recycling unit (not shown) can be provided to redirect the carrier fluid back into the supply system 14. It is understood that the nature of the carrier fluid is chosen according to the physical-chemical characteristics of the particles.

The particle supply system 16 is distinct from the carrier fluid supply system 14 and includes a number of laterally spaced-apart injectors 30. It contains a suspension of particles which is aimed at the surface of the film 26 of carrier fluid by the application of a slight pressure difference through the injectors 30. Again the number of injectors 30 is a function of the ramp width. After the injection, the particles 32 will be free to move throughout the whole surface of the carrier fluid and will rapidly diffuse in all directions to occupy the surface 24 from one edge to the other.

The carrier fluid supply system 14 and the particle supply system 16 work together to guarantee the uniformity and homogeneity of the final layer taking into account the particles self-assembly properties.

The carrier fluid transports the particles 32 down the ramp 12 to the dam 18. The dam 18 is formed by the pool of carrier fluid in the reservoir 28. The primary role of the dam 18 is to hold back the particles at the bottom of the ramp 12 so that the particles pile up side-by-side, thereby gradually forming a monolayer 34 of ordered particles on the carrier fluid. As shown in FIGS. 1 and 2, the monolayer of particles will gradually grow upward on the ramp 12.

According to a further embodiment of the present invention, the dam 18 could consist of a mobile barrier movable into the flow of carrier fluid to retain the particles 32 floating on the carrier fluid, while allowing the carrier fluid to flow to a downstream side of the barrier. Any other structure providing for the accumulation of the particles 32 from the bottom portion of the ramp 12 could be used as well.

The monolayer-transferring device 20 is provided in the form of a conveyor belt 36 and is operational to transport the so formed monolayer of particles to a desired location for further processing or storage.

The inclined surface 24 is the core of the apparatus 10 in that it is the site where the assembly of the monolayer takes place. Taking into account that a rather large number of physical and chemical variables intervene in the process of assembly, it must be pointed out that the final adjustment of the particles flow speed relies on the position of the ramp 12. In fact, it allows the modulation of the intensity of the gravitational component of the driving force: the steeper the inclination is the faster the particles 32 will flow. The parameters determining the speed of the flow are the steepness of the ramp 12, the viscosity of the carrier fluid and the adhesion of its molecules with the top surface 24 of the ramp 12, in accordance with the following proportionality: $V \propto d. \sin \Theta / \eta$ A where V is the speed, $\eta$ is the viscosity, A is the adhesive coefficient between the inclined surface 24 and the carrier fluid, d is the film thickness and $\Theta$ is the angle of the ramp 12 with respect to the horizontal.

The use of the gravitational force to pile up the particles 32 side by side on the surface 24 advantageously obviates the needs to resort to mechanical devices to produce the necessary driving force in order to assemble the particles 32 on the surface of the carrier fluid flowing on the inclined surface 24.

The performance of the present method essentially relies on a number of features and characteristics that can be summarized as follows:

the force driving the carrier fluid forward is generated by the natural gravitational field of Earth;

the particles 32 are deposited onto the fluid gas-liquid interface which therefore carries the particles 32 forward;

a monolayer is grown by piling up one by one, side by side the particles 32 onto a fluid interface, The monolayer is eventually transferred onto the conveyor 36 for further treatment.

The present invention is advantageous over conventional methods and apparatuses in that:

There are no mobile parts for the preparation of monolayers. This means no fancy control of mechanical parts, neither costly machine shop operation nor adjustment.

The monitoring of the various phases of the production is a lot easier onto a flat and immobile panel or plate than on a round and rotating cylinder.

The industrial production of large surfaces is easier than any other existing method, because of the absence of mobile parts.

The monitoring zone to control the production of monolayers can be as large as necessary.

Figure 3:
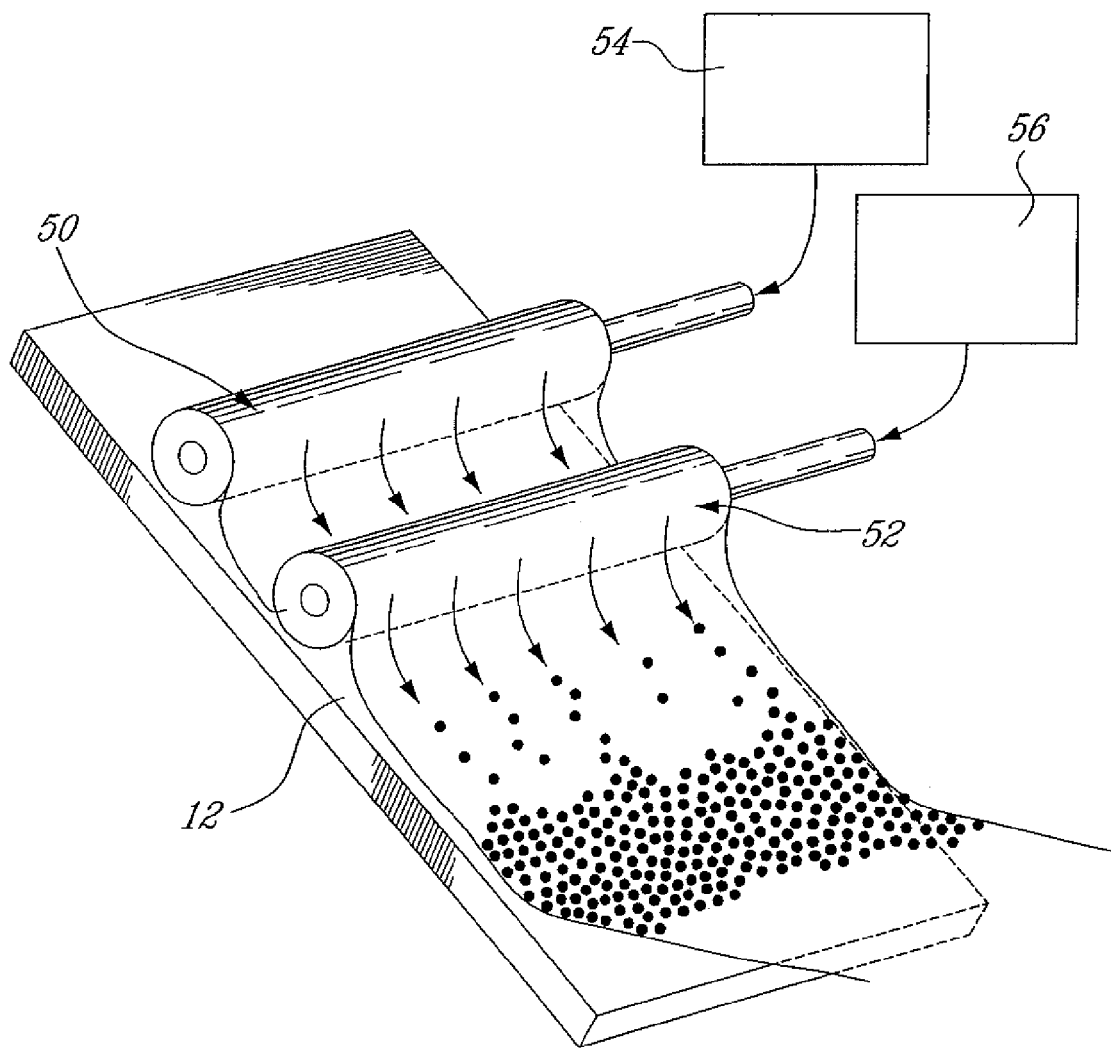
FIG. 3 is a schematic perspective view of an hydrophilic plate upon which a carrier fluid is dispensed by means of a first porous injector for transporting the particles deposited onto the carrier fluid by a second porous injector in accordance with a second embodiment of the present invention.

According to a further embodiment of the present invention, which is shown in FIG. 3, the carrier fluid injector is provided in the form of a porous cylindrical injector 50 extending transversally of the upper end portion of the ramp 12. The injector has a cylindrical body defined by a circumferentially extending wall that can be made of a porous material or, alternatively, of an impermeable material, which has been perforated so as to define a plurality of outlet holes. In the case of a perforated tube, a porous filter sheet could be wrapped around the filter to provide for a more uniform flow of the carrier fluid radially outwardly of the distribution cylindrical injector 50. In this way, the carrier fluid will flow downwardly over all the surface of the ramp 12 without surface turbulence.

As shown in FIG. 3, the particles could be deposited and carried at the top surface of the carrier fluid by means of a suspension injector 52. The suspension injector 52 could take the form of a cylindrical porous injector similar to the one used for distributing the carrier fluid. As shown in FIG. 3, the suspension injector 52 extends transversally of the ramp 12 downstream of the point of injection of the carrier fluid, i.e. below the cylinder 50. According to the illustrated embodiment the particles to be assembled together to form the monolayer are in suspension in a liquid. The suspension liquid is fed to the injector 52 and cause to flow radially outwardly through the walls thereof onto the carrier fluid flowing under the injector 52.

The cylindrical porous injectors 50 and 52 are respectively connected in fluid flow communication to a carrier fluid feeding system 54 and a suspension feeding system 56.

Figure 4:
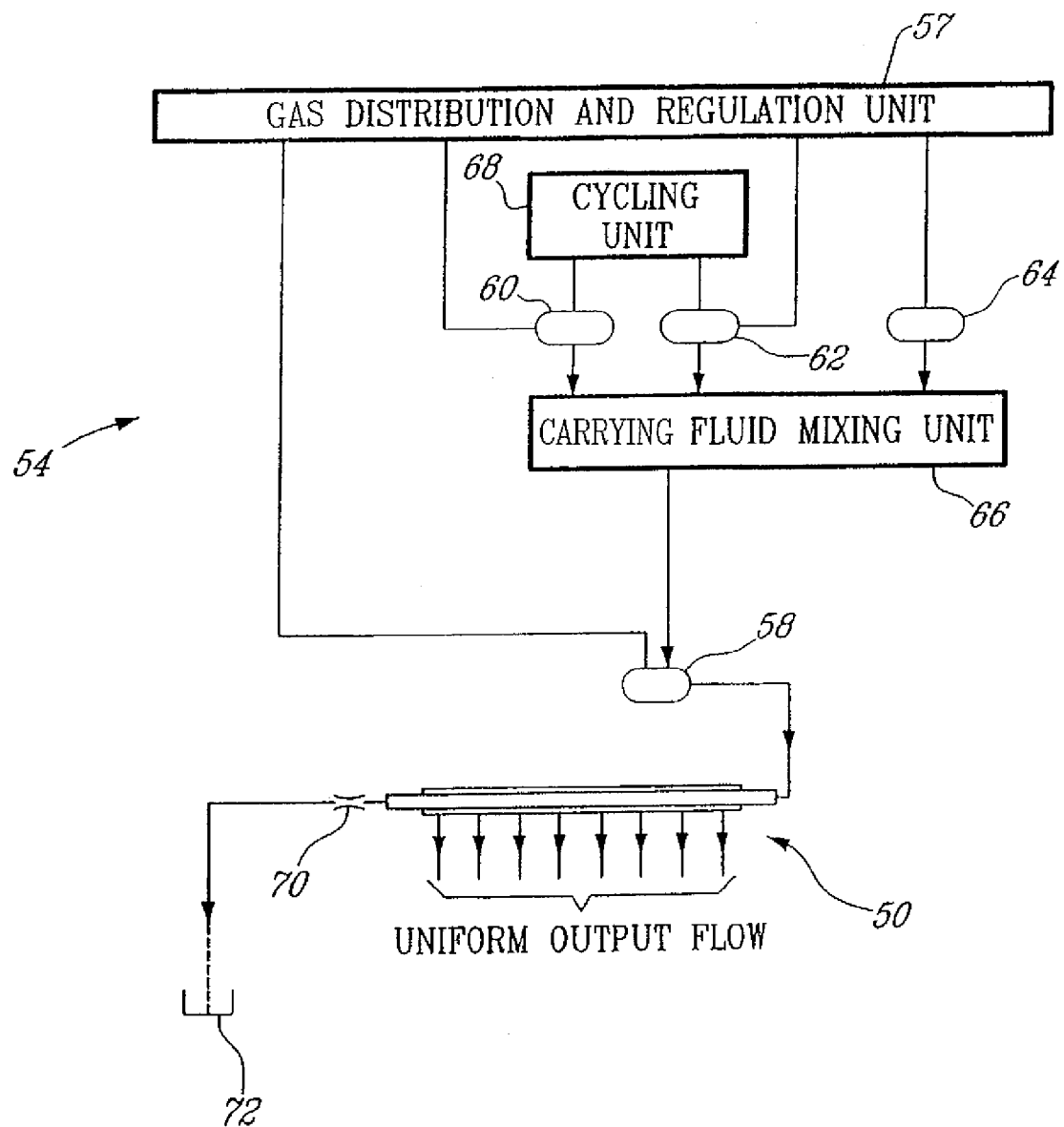
FIG. 4 is a diagram of a carrier fluid supply system for feeding the first porous injector shown in FIG. 3.

As shown in FIG. 4, the carrier fluid feeding system 54 comprises a gas distribution and regulating unit 57 which is operatively connected to a distribution reservoir 58, first and second carrier fluid reservoirs 60 and 62, and a fine tuning reservoir 64. The role of the gas distribution and regulating unit 57 is to pressurize the reservoirs 58, 60, 62 and 64 and maintain the pressure therein at a desired value. The pressure is determined in accordance with the desired output flow. The carrier fluid is stored in the first and second reservoirs 60 and 62. A cycling system 68 is operatively connected to the first and second reservoirs 60 and 62 for selectively opening one of the reservoirs 60 and 62. In this way, when one reservoir is being filled up, the system can still be fed by the other reservoir. If only one reservoir was used, the system would have to be shut down in order to permit filling of the reservoir. Accordingly, the carrier fluid will flow from a selected one of the reservoirs 60 and 62 to a carrying fluid mixing unit 66 where the carrier fluid is mixed with an additive, such as an acidic agent, fed from the fine tuning reservoir 64.

After having been mixed with the additive, the carrier fluid is directed into the distribution reservoir 58, which acts has a buffer to ensure that the fluid will be supplied to the porous injector 50 at the desired pressure. A valve (not shown) operatively connected to a control system (not shown) is operatively associated to the outlet port of the distribution reservoir 58 to regulate the flow of fluid that is fed to the porous injector 50. It is understood that a control valve is also provided at the outlet of the fine tuning reservoir 64 to control the flow of fluid therefrom. Likewise, it is implicit that the cycling system 68 includes a pair of valves at the respective outlets of the first and second reservoirs 60 and 62.

A flow restrictor 70 is provided downstream of the porous injector 50 to ensure that a major portion of the carrier fluid flows radially outwardly of the porous injector 50 as opposed to flowing along a straight path longitudinally therethrough. However, the small portion of the carrier fluid that will flow through the restrictor 70 will be directed into a drain 72 or, alternatively, back into the distribution reservoir 58.

FIG. 5 illustrates the suspension feeding system 56. As can be seen from FIG. 5, the suspension feeding system 56 is similar to the carrier fluid feeding system 54 in that it comprises a gas distribution and regulating system 57' operable to control the internal pressure of the reservoirs of the system. The system includes first and second reservoirs 60' and 62', a distribution reservoir 58', a fine tuning reservoir 64' and a suspension reservoir 63. The particles are in suspension in a liquid contained in the suspension reservoir 63. The suspension liquid is fed into a suspension mixing unit 66' where the suspension liquid is mixed with an additive fed from the fine tuning reservoir 64'. The suspension liquid is then directed into a recycling unit 74 in which is returned the suspension liquid which has flow longitudinally through the porous injector 52. The recycling system will fed one of the first and second reservoirs 60' and 62' while the other one of said reservoirs 60'/62' is connected in fluid flow communication with the distribution reservoir 58'. A suspension distribution unit 68' is provided to switch from one reservoir to the other by controlling the opening and closing of the inlet and outlet ports of the first and second reservoirs 60' and 62'. Accordingly, if the first reservoir 60' is being filled up, the suspension distribution unit 68' will open the outlet port of the second reservoir 62' for allowing the liquid suspension to flow from the second reservoir to the distribution reservoir 58'. The flow of liquid suspension from the distribution reservoir is regulate by a control valve (not shown) connected to the control system. The liquid suspension will leave the distribution reservoir 58' at the desired pressure fixed by the gas distribution and regulation unit 57' and flow into the porous injector 52. A flow restrictor 70' is provided downstream of the porous injector 52 to force the liquid suspension to flow radially outwardly through the porous wall of the injector 52.

As shown in FIGS. 6 and 7, the apparatus 10 also preferably includes a monitoring system 80 for obtaining on-line feedbacks on the monolayer production. It was observed that the creation of the monolayer is accompanied by the generation of a crest 82 or wave at the surface of the carrier fluid approximately 1 or 2 cm upstream of the trailing end of the monolayer. This crest or wave can thus be advantageously used to follow the growth of the monolayer. By detecting the position of the crest 82 one can ascertain how much particles have been piled up once against the other. In this way, it is possible to control the speed of the exit conveyor 20 as well as the distribution rate of the particles so that the number of fed particles is equal to the number of monolayer assembled particles that are removed from the dam 18 by the exit conveyor.

The position of the crest and thus of the trailing end of the monolayer being formed is, for instance, detected by directing a beam of light or ultrasound to the surface of the carrier fluid downstream of the second porous injector 52 and by receiving the reflected beam. As shown in FIG. 7, the position of the crest is determined as a function of the reflection angle of the incident beam.

Experimentation

The prototype built following the scheme of FIG. 1 was used in some preliminary experiments on the present method. In the prototype, syringes placed in the upper part of the ramp were used as injectors both for the carrier fluid and for the particles suspension. The plunger of each syringe was driven by an actuator comprising a plate pushing on the plunger head by means of a screw rotating at a constant speed. An actuator known under the name of “Harvard Apparatus 22 syringe pusher” can be used. Prior to the injection, the volume of each syringe and the surface of the plunger are used to determine the speed of the longitudinal displacement of the plunger in order to provide the desired injection rate. The needle of each syringe was adjusted into a tube ending to the air-water interface. The carrier fluid was chosen to easily drag particles on its surface downward along the ramp. According to this specific example, the carrier fluid was water.

Micrometric particles were chosen in order to produce optical effects visible to the naked eye: the change in appearance of the liquid surface from milky to iridescent was used to monitor the formation of thin films.

The procedure consisted in aiming the particles at the surface of the carrier liquid, which flows by gravity along the top surface of the ramp. When a dam in the form of a mobile barrier was placed at the bottom of the ramp, iridescence appeared thus indicating the beginning of the thin film formation on the surface of the carrier fluid. In preliminary experiments, the particle feeding was stopped as soon as a sufficiently large surface of film or monolayer had been produced. After evaporation of the carrier liquid from the top surface or the ramp, the obtained film was uniform and did not show visible defects and iridescence was permanent.

In the same way, monolayers of lipids were also prepared. The monolayers were prepared using an amphiphilic molecule, dioleoylphosphatidylcholine (DOPC). This molecule was mixed with benzene and the solution (typically $10^{-4}$ M) deposited at the air-water interface using the above-described injector. The concentration was adjusted in such a way that the injector flow and the monolayer production rate were balance to about 1 mm per second. The existence of the monolayer was revealed by the hydrophobicity of the substrate on which was transferred the monolayer. The efficiency of the monolayer production was also determined knowing the volume of the solution injected as well as the solution concentration and the molecular area, and the total surface of the solid substrate covered.

Monolayers and Multilayers Collecting System

There are two situations concerning the collection of the forming monolayer.

In the first case, the layer of particles can be collected directly on the ramp, so it does not need to be transferred to a substrate. Under these circumstances, a barrier placed at the bottom of the ramp retains the flow of particles in order to make the monolayer grow upwards. Once the process is stopped, the carrier fluid is allowed to evaporate or flow below the barrier or absorbed by the ramp or solidified in place (by cooling, polymerization or other processes). After the process, the coated plate is removed.

In the second case, the barrier is replaced by a support holding the substrate on which the monolayer is to be placed. This substrate may be rigid, flexible or even fluid. In the case of rigid substrates, such as microscope slides, the size of the monolayer that can be made is obviously limited by the dimensions of the substrate itself. When the substrate is a fluid, the limit is essentially on the area of the surface to be covered. On the other hand, the use of flexible substrates, like rolled plastic bands, Teflon, paper or silk (and this is not an exhaustive list), allows a continuous production and transfer of particles which is only limited by the injection capabilities.

The transfer of the monolayer from the surface of the carrier fluid to the substrate is made by engineering the interactions among the three substances: the assembled particles, the carrier fluid and the substrate. Examples of these interactions may be: repulsive or attractive forces, hydrophilic, hydrophobic or chemical affinity, interactions based on electric charge or on magnetic fields. Multilayers can also be obtained by the superposition of successive layers obtained with the procedures described above.

Types of Particles

Particles of any dimension and shape can be used in accordance with the present invention. The final product for the industry will determine the size, shape, nature, composition, and surface properties of the particles. The particles could be as small as a nanometer (fatty acid, fatty alcohol, $C_{60}$, pigments, magnetic clusters), few nanometers (proteins: enzymes, molecular pumps, ionic channels, antibodies), tens of nanometers (viruses, big macromolecules, small metallic and non metallic colloids), hundred of nanometers (latex particles, medium colloids, large viruses), micrometric particles (bacteria, small cells, glass beads, optical particles) and ten micron particles (cells, large colloids, fibers, lenses).

Gravitational field: use is made of the natural gravitational field of Earth. However, any massive body can generate its own gravitational field. Moreover, in the future an artificial gravitational field or a physical effect that produces a similar effect on masses (for instance, centrifugal force) is considered suitable to generate the same driving force onto the carrier fluid.

The fluid that carries particles forwards maybe any liquid, sometimes named subphase. It can be aqueous or not, pure water, melted metals, liquid nitrogen, etc. Its role is to keep particles at its surface by any combination of forces, among them Archimedes, electrostatic, magnetic, buoyancy, hydrophobic, etc.

Treatment on Monolayers

The mechanical, thermal, electrical, magnetical, optical, chemical and biological properties of monolayers are designed by the choice and the orientation of the particles. The extreme thinness of the monolayers and the orientation of the particles provide exceptional performances: fast dissipation of heat, high capacitance, high permeability, sensitive mass, chemical and bio-detection, 2D crystals, quantum dot array, tunneling effects, high information density, superconductivity, etc.

The piling up of particles side by side in a sequential manner can be made in parallel to physical or chemical treatments on the particles, for instance electromagnetic radiation: they can be anywhere between microwave to gamma rays, in order to melt, ionize, polymerize, oxide, etc, chemical reaction. Adding enzymes, chemical reagents, catalysis, binding agent for inter-particles cross linking, detergents, solvents, etc.

Types of Monolayers and Multilayers

A monolayer is a two dimensional world. In this world, particles can move as free as in a gas, or with some restrictions like in a liquid, or be fixed like in a solid. The solid can be either amorphous or crystallized.

The present method can make continuously several meter large monolayers, for very large industrial production. At the opposite, for microelectronics and bio detection, the monolayer stripes could be only a micrometer large. Due to the quickness and the versatility of the present method, the type of particle monolayered can be switched during the production to make monolayers with different kinds of material. The regularity of the process can be used to make stripes of different kinds in parallel or perpendicular to the main axis of production.

The present method is capable of depositing any kind of monolayers on any kind of surface, liquid or solid. This versatility in coating provides a tremendous potential of application. The surfaces could be either hydrophobic or hydrophilic. Moreover, the roughness of the surface is not important for the transfer efficiency of the monolayer onto the surface itself. Virtually any surface can be coated by the present method.

Once a single monolayer is made, another layer can be deposited on top of it. This superposition of layers is named multilayer. Since the present method is very quick and continuous, an unlimited number of superpositions can be reached by wrapping on a wheel for instance. The present method is capable of superposing monolayers made of the same or different kinds of material. This superposition, or well oriented-arranged particles, is named molecular architecture.

Examples of Applications

As mentioned above, a monolayer is made of particles. They can be made of a single kind of particles making the monolayer, but they can also be a combination of particles to provide the monolayer particular desired effects. Moreover, the vast choice of particles presently available on the market, combined with particles that could be synthesized in the present state of the art physico-chemical laboratories, provides the present method a quasi-infinite choice of materials to use and therefore monolayers to prepare.

Mechanical

The present method produces defect-free monolayers. The particles chosen can be soft or hard, mobile or fixed. So the surface properties can be controlled from frictionless to high friction, from non-adhesive to adhesive, from hard to soft; from plastic to elastic.

Because of the monolayer thinness, the mechanical properties like the specific mass per area, speed of waves and elasticity are highly perturbed when touched by a foreign body. These intrinsic properties can be useful for detection of small object like dusts, viruses, or specifically adhesive substances (antibodies, or chemical reagents).

Thermal

The very large surface to volume ratio provides the monolayer a tremendous fast capacity of heat dissipation. It could be one way to go through the heat wall encountered by the todays computer industry.

Chemical

Because of the high surface to mass ratio, a solid catalysis is more active in a monolayer organization. Transport of reactive and products are easier and fluid sensors can be more sensitive.

Monolayers or multilayers can be placed between two different fluid phases to control and catalyze reactions at their interface. An excellent example of such strategy is encountered in nature with photosynthesis. Leaves are made of lipid bilayers in which proteins making the nanofactories for the solar energy conversion are embedded. They are nano-electrolytic cells providing oxygen and food for the whole life on Earth. Therefore, synthetic chemical or biochemical devices based on monolayers containing nanofactories could be constructed.

Electrical

The choice of conducting materials allows the fabrication of thin conductors. The alternation of such foils with monolayers of non-conducting materials means large surfaces separated with nanometer thin isolators. However, the level of monolayer quality must be high enough not to create defects through which electric charges might flow. As an example, the lipid bilayer making the outer envelope of nervous fibers is only about 4 nanometers thick, and it nevertheless sustains voltages as high as about 0.2 volt, which make a tremendous electric field of the order of 100 million volts per meter across it. The present method provides a way in which high capacitance assembly can be built directly on silicon of integrated circuits.

Electronics

The present method can provide a very thin isolating layer for a better field effect transistor. The high quality of the monolayer and the vast choice of isolating materials can keep the electric charge longer and for less recharge energy. This is important for long lasting electrostatic memory.

Nanolithography has discovered recently that lines are sharper if written on molecular monolayers because of their extreme thinness. Lines of a few nanometers large and apart were drawn, opening the way for a new breakthrough in nano-engineering. The present method provides for uniform coating, thereby allowing the production of circuitry at very high density. Moreover, the possibility to superpose the monolayers one above the other means that this nanocircuitry density could be multiplied by the number of piled-up monolayers.

The nanometer dimension also means that quantum electronics, for example electron tunneling, can be brought to profit.

Magnetic

The magnetic induction is faster, easier and more intensive across a very thin membrane like a monolayer. A higher number of coils could be stacked in a given space.

Monolayers can provide thin devices for measuring and using the Hall effect and quantum magnetic fields.

The present method provides the high regularity and perfect control of deposition of magnetic particles for making high surface densities of magnetic domains for massive data storage.

Superconductor

According to the present trend in the superconductor's research, the best superconductors are in reality multilayers of two-dimensional conductors. The present method produces high quality two-dimensional structures, crystalline, quasi-crystalline or amorphous, in a large range of thickness and choices of material. Monolayers of two dimensional superconductors, conductors or isolators with special magnetic properties can be superposed in any order to make multilayer assembly.

Optical

The thinness of monolayers can be adjusted for making a large range of interferential filters, lenses or reflectors from the X-ray to the infrared wavelength. Controlled thinness is also critical for optical tunneling effects.

If chiral or birefringent materials are used, a lot of chiral effects are available, including ellipsometric effect and Kerr effect.

Interferential effects can also be obtained by two-dimensional (2D) arrays of particles because the present method provides high regularity and perfect control of deposition of optical particles and 2D crystals.

All these effects can be used to make holography, flat electronic display and other imaging devices.

State-of-the-art combination of monolayers can make surface inimitable by any other methods. Therefore, the present method is particularly well suited for making credit cards, cash cards, paper money, identity cards, key locks, security seals and other identification surfaces.

Filtration

Pores of predetermined dimension, shape and chemical properties can be produced by introducing molecular pumps or ionic channels in monolayers or by removing some specific particles. Therefore, fluids can flow rapidly across the monolayers because of the short length of the pore. With the present method, the pores are equal and optimized because their assembly is very well controlled. Moreover, the present method, exploiting the self-assembly properties of particles, controls their arrangement at the nanometer scale, which guarantees optimization of their uniform and homogeneous distribution.

Depending on the choice of the pore diameter and design, ions, small molecules, proteins, viruses, cells, dusts, and other particles suspended in air, water or other fluids can be retained or can pass selectively. Due to the versatility of the channels, pores or other predetermined apertures across the monolayer, they can be used for macro filtration, ultra filtration, osmosis and dialysis. A very small pressure drop is needed for fast flow because of the thinness of the monolayer.

Health, Food and Environment

The present method is particularly well adapted to handle soft materials because of their very short time of transit at the interface during the make of the monolayer. Therefore, by using components encountered in living systems, their biological functions can be used to specifically detect molecules like proteins, or whole living systems like viruses, tumors or bacteria. Combined with the large area to volume ratio of the monolayers, a highly sensitive biosensor can be achieved.

The present method is very well suited for 2D crystallization of proteins. This could be a process for the purification and characterization of proteins.

Like the Langmuir method, the present method can be used for making biomimetic models to study living systems. It is a better method because it is faster and can be much less aggressive for biological material. It is not necessary to use volatile solvents.

The efficiency of the monolayer filters would be low energy costs for efficient removal of polluting agents.

The invention claimed is:

1. A device for producing a thin film from particles, comprising a ramp having an upper end portion and a lower end portion, said ramp having a width and defining a slope, a fluid supply system for delivering an adjustable flow of carrier fluid to said upper end portion of the ramp, the carrier fluid delivered to said upper end portion of the ramp flowing by gravity along the ramp to said lower end portion of the ramp, a particle supply system delivering particles at an adjustable rate to said upper end portion of the ramp at a location downstream of a source of the flow of carrier fluid on the ramp, the carrier fluid transporting the particles towards the lower end portion of the ramp, a horizontal transferring zone adjacent to the lower end portion of the ramp to cause incoming particles to gradually pile up one against the other in a film configuration at the lower end portion of the ramp, said horizontal transferring zone having a width which is substantially equal to the width of the ramp, a transferring device for withdrawing, at a controlled rate, the film from the horizontal transferring zone while the film is being grown on the ramp, the film being transferred on a substrate carried by the transferring device, the substrate being located on one side of the film and moving in the downstream with respect to the carrier fluid flow, a control system monitoring a position of a crest at the surface of the carrier fluid just upstream of a trailing edge of the film being grown up on the ramp, the control system adjusting the rate at which the carrier fluid and the particles are dispensed and the rate at which the film is withdrawn by the transferring device as a function of the position of the crest on the ramp.

2. An apparatus as defined in claim 1, wherein said ramp has a hydrophilic surface.

3. An apparatus as defined in claim 1, wherein said fluid supply system includes a porous injector extending transversally of the ramp.

4. An apparatus as defined in claim 3, wherein said porous injector is provided in the form of a cylinder defining a central passage for receiving the carrier fluid, said central passage being circumscribed by a porous wall through which the carrier fluid is force to flow.

5. An apparatus as defined in claim 1, wherein said fluid supply system includes at least one pressurized reservoir for storing said fluid, the internal pressure of the reservoir being maintained at a value fixed according to a desired rate of flow of said carrier fluid on said ramp.

6. An apparatus as defined in claim 5, wherein said fluid supply system further includes a carrier fluid mixing unit for mixing the fluid received from said at least one pressurized reservoir with an additive received from a fine tuning reservoir to provide a mixture, the mixture being directed to a pressurized distribution reservoir before being dispensed onto said ramp.

7. An apparatus as defined in claim 6, wherein said carrier fluid mixing unit is selectively connectable to a second pressurized reservoir for allowing the apparatus to be operated in a continuous mode even when the first pressurized reservoir has to be filled up.

8. An apparatus as defined in claim 6, wherein said fluid supply system further includes a porous injector having a wall defining a central passage in fluid flow communication with said distribution reservoir, and a flow restrictor downstream of said porous injector for inducing a flow of fluid from said central passage through said wall.

9. An apparatus as defined in claim 1, wherein said particle supply system comprises a porous injector adapted to receive a flow of liquid in which the particles are in suspension, the porous injector being positioned to distribute the particles at the surface of the carrier fluid flowing under said porous injector on said ramp.

10. An apparatus as defined in claim 9, wherein said particle supply system comprises a suspension reservoir and a fine tuning reservoir adapted to be selectively placed in fluid flow communication with a suspension mixing unit which is in turn connected in fluid flow communication with a distribution reservoir, the fine tuning reservoir containing an additive to be added to the suspension liquid, and a pressurizing unit for maintaining said suspension reservoir, said fine tuning reservoir and said distribution reservoir at a desired pressure.

11. An apparatus as defined in claim 10, wherein said particle supply system comprises a flow restrictor to cause a major portion of the liquid and particles directed into the porous injector to flow outwardly through a wall thereof said porous injector, and a recycling unit for receiving the portion of the fluid which has passed through the flow restrictor.

12. An apparatus as defined in claim 11, wherein said recycling unit is selectively connected to one of a pair of reservoirs which are selectively connectable in fluid flow communication with the distribution reservoir.

* * * * *